US012806777B2

(12) United States Patent
Kogan

(10) Patent No.: US 12,806,777 B2
(45) Date of Patent: Nov. 24, 2026

(54) PLANNING OF ROBOT PATHS, AND ROBOT CONTROL

(71) Applicant: KUKA Deutschland GmbH, Augsburg (DE)

(72) Inventor: Yevgen Kogan, Augsburg (DE)

(73) Assignee: KUKA Deutschland GmbH (DE)

( * ) Notice: Subject to any disclaimer, the term of this patent is extended or adjusted under 35 U.S.C. 154(b) by 86 days.

(21) Appl. No.: 18/876,065

(22) PCT Filed: Jul. 17, 2023

(86) PCT No.: PCT/EP2023/069746

§ 371 (c)(1),
(2) Date: Dec. 17, 2024

(87) PCT Pub. No.: WO2024/041808

PCT Pub. Date: Feb. 29, 2024

(65) Prior Publication Data

US 2026/0257358 A1 Sep. 3, 2026

(30) Foreign Application Priority Data

Aug. 24, 2022 (DE) ..................... 10 2022 208 769.0

(51) Int. Cl.
*B25J 9/16* (2006.01)

(52) U.S. Cl.
CPC .................................. *B25J 9/1664* (2013.01)

(58) Field of Classification Search
CPC ...................................................... B25J 9/1664
See application file for complete search history.

(56) References Cited

U.S. PATENT DOCUMENTS

2014/0005804 A1 1/2014 Brand
2017/0120447 A1* 5/2017 Inoue .................... B25J 9/1671
(Continued)

FOREIGN PATENT DOCUMENTS

DE 102011005513 A1 9/2012
DE 102017129665 B3 1/2019
(Continued)

OTHER PUBLICATIONS

European Patent Office; Search Report in related International Patent Application No. PCT/EP2023/069746 dated Oct. 2, 2023; 4 pages.

(Continued)

*Primary Examiner* — Jonathan L Sample
*Assistant Examiner* — Heather J Keniry
(74) *Attorney, Agent, or Firm* — Dorton & Willis, LLP

(57) ABSTRACT

A method for robot-path planning includes steps of dividing an application into at least two successive phases; specifying constraints for the phases; assigning priorities to the constraints; and planning a partial path for carrying out the phase for which the constraint assigned the higher priority has been specified, while taking this constraint into account. Subsequently, a partial path for carrying out the phase for which the constraint assigned the lower priority has been specified is planned, while taking this constraint into account and on the basis of the planned partial path; and the path of the robot is planned. The planned partial paths are joined together in a transitional region and these joined partial paths formed the path of the robot or part of this path.

9 Claims, 1 Drawing Sheet

(56) References Cited

U.S. PATENT DOCUMENTS

| | | | | |
|---|---|---|---|---|
| 2022/0032461 | A1 | 2/2022 | Gupta et al. | |
| 2023/0202026 | A1* | 6/2023 | Rus | B25J 9/1664 700/264 |

FOREIGN PATENT DOCUMENTS

| | | | |
|---|---|---|---|
| DE | 102017011130 | B4 | 3/2021 |
| DE | 102020201398 | B3 | 4/2021 |
| DE | 102020206913 | A1 | 12/2021 |
| DE | 102020214231 | A1 | 5/2022 |
| WO | 2021099948 | A1 | 5/2021 |

OTHER PUBLICATIONS

German Patent Office; Examination Report in related German Patent Application No. 10 2022 208 769.0 dated Mar. 16, 2023; 6 pages.

* cited by examiner

PLANNING OF ROBOT PATHS, AND ROBOT CONTROL

CROSS-REFERENCE TO RELATED APPLICATIONS

This application is a national phase application under 35 U.S.C. § 371 of International Patent Application No. PCT/EP2023/069746, filed Jul. 17, 2023 (pending), which claims the benefit of priority to German Patent Application No. DE 10 2022 208 769.0, filed Aug. 24, 2022, the disclosures of which are incorporated by reference herein in their entirety.

TECHNICAL FIELD

The present invention relates to a method for planning a path of a robot for carrying out an application or for controlling the robot, and to a system, computer program or computer program product for carrying out a method described herein.

BACKGROUND

To carry out an application with a robot, its path often has to be planned. In the present case, a path of a robot is understood in one embodiment to mean, in a manner customary in the art, a sequence of positions $q_i$ of the robot or its (movement) axes or joints. In this present case, a position of the robot can be determined in one embodiment, in a manner customary in the art, by the positions of its (movement) axes or joints, for example axis or joint angles, or by a, preferably six-dimensional, pose X of a robot-fixed reference, in particular an end effector or TCP, optionally in conjunction with additional redundancy parameters (e.g., elbow angle or redundancy angle or the like), or defined in another way, in particular specified. A pose, in particular a pose of a robot-fixed reference, defines in the present case, in one embodiment and in a manner customary in the art, a one-, two- or three-dimensional position and/or a one-, two- or three-dimensional orientation (of the robot-fixed reference); a robot-fixed reference can in the present case in particular be an end effector, end flange or end member or TCP of the robot or be stationary with respect thereto.

In particular, if the robot is redundant with regard to the application, purely by way of example, if a seven-axis robot arm is to approach specified three-dimensional positions with its end effector without an orientation being specified, optimization methods are used according to internal practice, for which certain constraints are specified. For example, a robot is to approach an initial pose of a processing, inspection and/or measuring path for processing, inspecting or measuring a workpiece, with its end effector from a start or current pose or position without collision and as quickly and/or energy-efficiently as possible and subsequently guide a processing, inspection and/or measuring tool along a workpiece contour on the processing, inspection and/or measuring path without collision to a final pose of the processing, inspection and/or measuring path and, optionally, follow the workpiece contour with its end effector, and optionally implement a specified orientation of the end effector (for example, align the tool perpendicular to the workpiece surface).

This example makes it clear that in general, in a robot application, different constraints often have to be satisfied in phases, with some constraints being more important than others (in the example above, for example, it may be more important to follow the workpiece contour than to approach the initial pose as quickly and energy-efficiently as possible). The present invention is not limited to the purely exemplary use in the case of robots that are redundant with regard to application and/or the use of optimization methods, but this is a particularly advantageous use of the present invention.

One conceivable approach is to plan the entire path for the application integrally or in one step over its entire length, taking into account the different constraints in phases. However, this is a very complex optimization problem, which not only leads to high demands on computing time and performance, but in particular can also lead to undesired dead ends in the form of local minima.

SUMMARY

The object of the present invention is to improve the path planning and/or control of a robot.

This object is achieved by a method, a system, and a computer program or computer program product for carrying out a method as described herein. The dependent claims relate to advantageous further embodiments.

According to one embodiment in accordance with the present invention, a method for planning a path of a robot for carrying out an application (with the robot; "robot application" or "robot path") comprises the steps of:

- dividing the application into at least two successive phases, in one embodiment specifying a transitional region, in a further development specifying a transitional pose of the robot-fixed reference or transitional position of the robot, between the two successive phases, in one embodiment dividing the application into at least three successive phases, in particular specifying a transitional region, in a further development specifying a transitional pose of the robot-fixed reference or transitional position of the robot, between each two successive phases;
- specifying a constraint for the one phase of the at least two successive phases and another constraint different herefrom for the other phase of the at least two successive phases, in one embodiment specifying one constraint for each of the at least three successive phases, wherein preferably at least two of these constraints are different from one another; and
- assigning a priority (level) to each of these constraints.

The robot has, in one embodiment, at least three, in particular at least six, in one embodiment at least seven (movement) axes or joints, in particular swivel axes or joints. In one embodiment, the robot has a, in particular stationary or mobile, robot arm with at least three, in particular at least six, in one embodiment at least seven, (movement) axes or joints, in particular swivel axes or joints. In one embodiment, the robot has a robot-fixed reference which can in particular be an end effector, end flange or end member or TCP of the robot or can be stationary with respect thereto, wherein the application can comprise poses, in particular, in each case, a one-, two- or three-dimensional position and/or one-, two- or three-dimensional orientation of the robot-fixed reference, which the robot is to approach or assume with the robot-fixed reference consecutively or successively in order to carry out or while carrying out the application.

The present invention is particularly suitable for such robots due to their fields of application and kinematics.

The application is divided into successive phases in one embodiment on the basis of a user input or specification or a higher-level automatic application planning and/or on the basis of different work operations or objectives for the individual application phases, for example transfer or transport processes or phases, in particular from and/or to work stations and/or from and/or to conveying or storage stations, on the one hand, and processing or work operations or phases, on the other hand, or the like. In one embodiment, two successive phases adjoin one another in a transitional region, in a further development in a transitional pose of the robot-fixed reference or transitional position of the robot, wherein in a further development this (these) transitional region(s) have been or are specified, in one embodiment during the division or in order to divide the application into the phases and/or on the basis of a user input or specification or a higher-level automatic application planning.

One or more of the constraints may (each) comprise collision avoidance, (the assumption of) one or more specified poses of the robot-fixed reference and/or an optimization of a travel time, a load, in particular stress and/or acceleration, and/or an energy requirement of the robot for carrying out the corresponding phase of the application or the like and/or be one- or multi-dimensional constraints for an optimization method or be specified as such.

The assignment of the priorities (priority levels) to the constraints is carried out in one embodiment on the basis of a user input or specification or automatically, in a further development on the basis of a specified hierarchy of constraints or the like. Priorities (priority levels) can also be assigned by default, so that, for example, by specifying a (higher or lower) priority (level) for one of two constraints, this constraint is or has a higher or lower priority than the other, without this other constraint having to be explicitly assigned a priority (level). Accordingly, for example, by specifying a higher and a lower priority (level) for two of three constraints, these constraints can have a higher or lower priority than the third constraint, without this third constraint having to be explicitly assigned a priority (level).

According to one embodiment in accordance with the present invention, the method comprises the steps of:

planning a partial path for carrying out the phase of the at least two, optionally at least three, phases for which the constraint assigned the higher or highest of the priorities has been specified, while taking into account this (highest-priority) constraint ("highest-priority partial path");

subsequently planning a partial path ("second-priority partial path") for carrying out the phase of the at least two, optionally at least three, phases for which the constraint assigned the (next) lowest of the priorities has been specified, while taking this constraint into account and on the basis of the previously planned highest-priority partial path, in one embodiment on the basis of or using a pose of the robot-fixed reference and/or a position of the robot at an or the end of the previously planned partial path that faces the partial path currently to be planned, preferably in such a way that the two partial paths have this pose or position in their transitional region;

optionally, subsequently planning a partial path for carrying out the phase of the at least three phases for which the constraint assigned the lowest of the three priorities has been specified, while taking this constraint into account and on the basis of the previously planned highest-priority or second-priority partial path, in one embodiment on the basis of or using a pose of the robot-fixed reference and/or a position of the robot at an or the end of the previously planned highest-priority or second-priority partial path that faces the partial path currently to be planned, preferably in such a way that the two partial paths have this pose or position in their transitional region; and planning the path of the robot for carrying out the application, wherein the planned highest-priority partial path and the planned second-priority partial path are joined together in a transitional region, optionally the third or last planned partial path is joined in a further transitional region with that of the highest-priority partial path and the second-priority partial path on the basis of which it was planned; and these joined partial paths form the path of the robot or part of this path.

One embodiment in accordance with the present invention is based on the idea of prioritizing the constraints to be satisfied in phases, then (in each case) planning a partial path for a phase with the higher-priority constraint and taking this already planned partial path into account in the subsequent planning of the partial path for the phase with the lower-priority constraint. In a preferred development, a pose of the robot-fixed reference and/or a position of the robot at the end of the already planned one of these two partial paths that faces the one of the two partial paths that is still to be planned is used in the planning of this partial path that is still to be planned, in one embodiment as a pose or position of this partial path to be planned. This makes it particularly clear that in one embodiment the planning of the partial path still to be planned can be improved, in particular in one embodiment a search space of an optimization method can advantageously be significantly reduced and/or the partial path still to be planned can be planned in such a way that the partial path already planned can be executed, in particular directly. Likewise, it is also possible to first further process the pose or position of the already planned path, for example to transform it in a specified manner, in particular to move and/or rotate or adjust it, and then to use it as the pose or position of the partial path to be planned, or to plan this partial path in another, preferably specified way, on the basis of the already planned partial path.

In one embodiment, at least one of the phases of the application has a processing, inspection and/or measuring phase for robot-assisted processing and/or inspection and/or measurement of a workpiece, in particular for holding and/or moving a robot-guided processing, inspection and/or measuring tool while it is processing or inspecting or measuring a workpiece, or for holding and/or moving a robot-guided workpiece while it is being processed or inspected or measured by a processing, inspection and/or measuring tool, and the partial path planned for carrying out this phase has a processing, inspection and/or measuring path of the robot, and can in particular be one such. In the present case, processing is understood to mean in particular material-removing processing such as grinding, sawing, drilling or the like, material-applying processing such as painting, coating or the like, joining processing such as welding, gluing, riveting or the like, and separating processing such as sawing or the like. In particular, measuring is understood in the present case to mean surveying.

Additionally or alternatively, in one embodiment, at least one of the phases of the application has an approach phase for approaching a processing, inspection and/or measuring path or a conveying or storage location and the partial path planned for carrying out this phase has an approach path of the robot, in particular can be such.

Additionally or alternatively, in one embodiment, at least one of the phases of the application has a departure phase for moving away from a processing, inspection and/or measuring path or a conveying or storage location and the partial path planned for carrying out this phase has a departure path of the robot, in particular can be such.

The principles of the present invention are particularly advantageous for such applications, in particular due to the constraints that often have to be taken into account.

In one embodiment, when planning at least one of the partial paths for carrying out one of the phases of the application, a part of the constraint is taken into account which is specified for carrying out a preceding or subsequent phase of the application, which phase is assigned a lower priority. In one embodiment, this part relates, preferably only, to the transitional region or a pose of the robot-fixed reference and/or a position of the robot at the end of the partial path currently being planned which faces the partial path for carrying out the preceding or subsequent phase of the application which is assigned the lower priority. In one embodiment, this also makes it possible to advantageously reduce the search space when planning the partial path for carrying out the phase of the application which is assigned the higher priority, thus improving the planning. Purely by way of example and for illustration, let us consider the case in which a prioritized approach to a processing, inspection and/or measuring path is planned and then the processing, inspection and/or measuring path itself is planned. In this case, it may be advantageous, when planning the approach path, to take into account an orientation that is specified or to be taken into account for the processing, inspection and/or measuring path or to (only) use the redundancy that is (still) available from the perspective of the partial path to be planned subsequently, in particular in the transitional region. A constraint in the sense of the present invention can in particular comprise a specified initial and/or a specified final condition of the application phase or of the partial path.

As already explained elsewhere, the principles of the present invention are particularly advantageous for robots that are redundant with regard to one or more of the phases of the application, since here different constraints often have to be taken into account in phases.

Preferably, one or more of the partial paths are planned (in each case) using an optimization method which is the same in one embodiment. This is particularly advantageous in combination with the taking into account of the prioritized constraints and thus leads to a multi-stage optimization in which partial paths are successively optimized by (individually) optimizing the respective partial path using an optimization method taking into account the respective constraint and, optionally, on the basis of an already planned partial path which adjoins the partial path currently being planned in a transitional region and/or part of a constraint for a partial path which is to be planned subsequently and which adjoins the partial path currently being planned in a transitional region.

According to one embodiment in accordance with the present invention, a method for controlling the robot comprises the steps of:

- planning a path of the robot according to a method described herein; and
- controlling the robot to follow the planned path, in particular to carry out an or the application.

According to one embodiment in accordance with the present invention, a system, in particular in terms of hardware and/or software, in particular in terms of programming, is configured to carry out a method described herein and/or comprises:

- means for dividing the application into at least two successive phases, in one embodiment specifying a transitional region, in a further development specifying a transitional pose of the robot-fixed reference or transitional position of the robot, between the two successive phases, in one embodiment dividing the application into at least three successive phases, in particular specifying a transitional region, in a further development specifying a transitional pose of the robot-fixed reference or transitional position of the robot, between each two of the three successive phases;
- means for specifying a constraint for the one phase of the at least two successive phases and another constraint different herefrom for the other phase of the at least two successive phases, in one embodiment specifying one constraint for each of the at least three successive phases, wherein preferably at least two of these constraints are different from one another;
- means for assigning a priority (level) to each of these constraints;
- means for planning a partial path for carrying out the phase of the at least two, optionally at least three, phases for which the constraint assigned the higher or highest of the priorities has been specified, while taking into account this (highest-priority) constraint ("highest-priority partial path");
- means for subsequently planning a partial path ("second-priority partial path") for carrying out the phase of the at least two, optionally at least three, phases for which the constraint assigned the (next) lowest of the priorities has been specified, while taking this constraint into account and on the basis of the previously planned highest-priority partial path, in one embodiment on the basis of or using a pose of the robot-fixed reference and/or a position of the robot at an or the end of the previously planned partial path that faces the partial path currently being planned, preferably in such a way that the two partial paths have this pose or position in their transitional region;
- optionally, means for subsequently planning a partial path for carrying out the phase of the at least three phases for which the constraint assigned the lowest of the three priorities has been specified, while taking this constraint into account and on the basis of the already planned highest-priority or second-priority partial path, in one embodiment on the basis of or using a pose of the robot-fixed reference and/or a position of the robot at an or the end of the previously planned highest-priority or second-priority partial path that faces the partial path currently being planned, preferably in such a way that the two partial paths have this pose or position in their transitional region; and
- means for planning the path of the robot for carrying out the application, wherein the planned highest-priority partial path and the planned second-priority partial paths are joined together in a transitional region, optionally the third or last planned partial path is joined in a further transitional region with that of the highest-priority partial path and the second-priority partial path on the basis of which it was planned; and these joined partial paths form the path of the robot or part of this path;
- and, in one embodiment, means for controlling the robot to follow the planned path, in particular to carry out an or the application.

In one embodiment, the system or its means is configured such that, when planning at least one of the partial paths for carrying out one of the phases of the application, a part of the constraint is taken into account which is specified for carrying out a preceding or subsequent phase of the application, which phase is assigned a lower priority.

In one embodiment, the system or its means for planning a partial path comprises an optimizer for planning the partial path using an optimization method.

A system and/or a means in the sense of the present invention may be designed in hardware and/or in software, and in particular may comprise at least one, in particular digital, processing unit, in particular microprocessor unit (CPU), graphic card (GPU) or the like, which is preferably data-connected or signal-connected to a memory system and/or bus system, and/or one or multiple programs or program modules. The processing unit may be designed to process commands that are implemented as a program stored in a memory system, to detect input signals from a data bus and/or to issue output signals to a data bus. A memory system may comprise one or more, in particular different, storage media, in particular optical, magnetic, solid-state, and/or other non-volatile media. The program may be designed in such a way that it embodies or is capable of carrying out the methods described herein, so that the processing unit is able to carry out the steps of such methods and thus, in particular, is able to plan the path or control the robot. In one embodiment, a computer program product may comprise, in particular be, an, in particular computer-readable and/or non-volatile, storage medium for storing a program or instructions or with a program stored thereon or with instructions stored thereon. In one embodiment, execution of said program or said instructions by a system or controller, in particular a computer or an arrangement of multiple computers, causes the system or controller, in particular the computer(s), to carry out a method described herein or one or more steps thereof, or the program or instructions are configured to do so.

In one embodiment, one or more, in particular all, steps of the method are fully or partially computer-implemented or one or more, in particular all, steps of the method are fully or partially automated, in particular by the system or its means.

In one embodiment, the system includes a or the robot.

Further advantages and features arise from the dependent claims and from the exemplary embodiments.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 2:
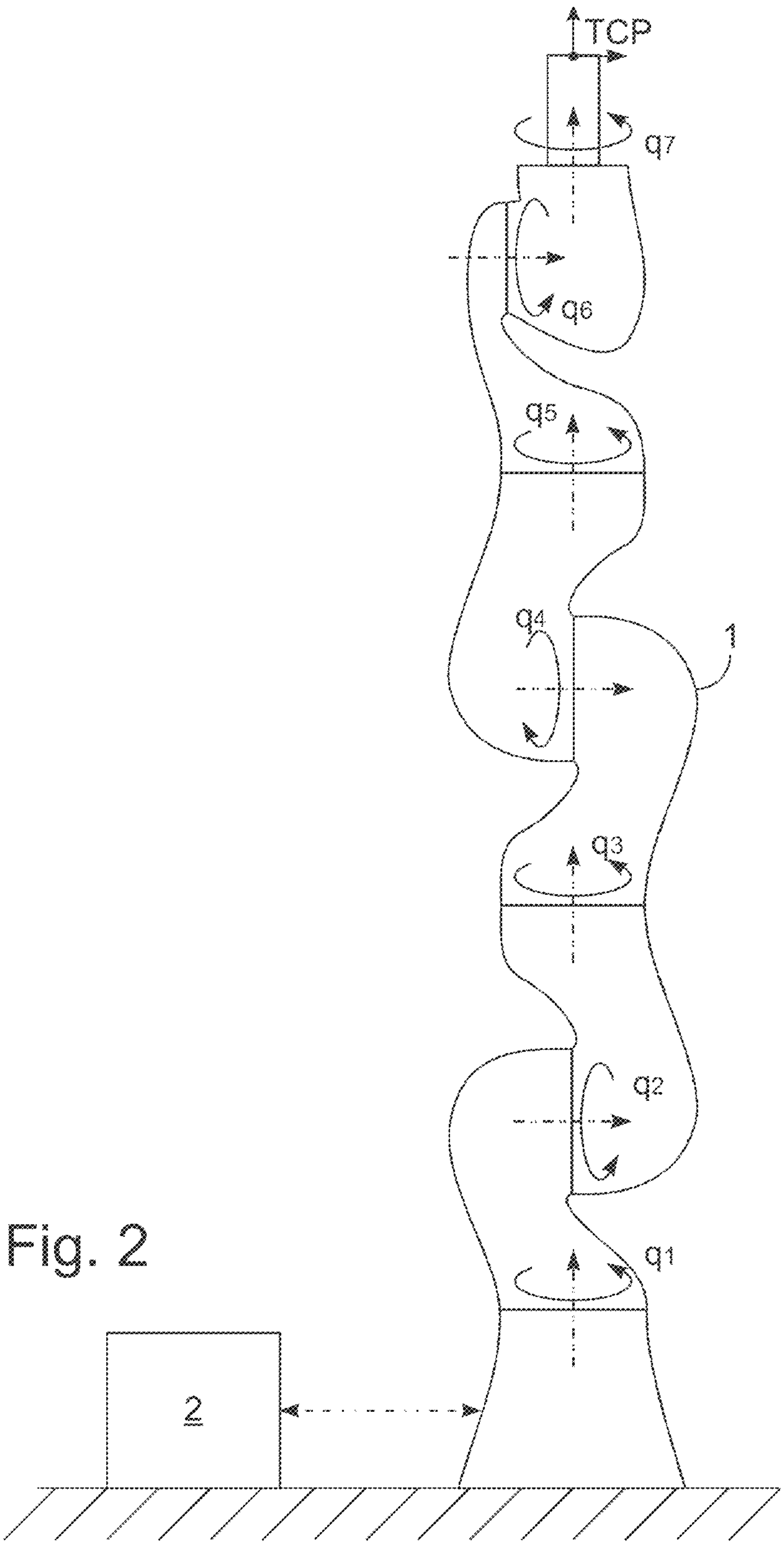
FIG. 2 shows a system according to one exemplary embodiment of the present invention.

FIG. 2 shows a system according to an exemplary embodiment of the present invention with a seven-axis robot (arm) 1 and a controller 2 for controlling the robot (arm) 1 or a path planning therefor according to an embodiment of the present invention.

As an example, the robot (arm) 1 is to approach a specified initial pose S of a processing, inspection and/or measuring path with its TCP from a start pose or position ("approach path"), then guide the TCP along a specified route to a specified final pose E and from there drive with its TCP into a target pose or position ("departure path").

On the processing, inspection and/or measuring path, a constraint $N_{SE}$ should be satisfied, for example to follow the specified route, for example a workpiece contour, without collision and with a specified orientation of the TCP.

On the approach path, another constraint $N_S$ should be satisfied, for example to approach the initial pose S without collision and as quickly as possible.

On the departure path, another constraint $N_E$ should be satisfied, for example, to approach the target pose or position without collision and as energy-efficiently as possible.

For path planning, the application described above or the path to be planned is first divided into several phases or partial paths in a step S10, in this example the approach or the approach path, the processing or inspecting or measuring or the processing, inspection and/or measuring path and the departure or the departure path. The division can be carried out in particular on the basis of a user input or specification or a higher-level automatic application planning and can comprise the specification of the transitional regions between the individual partial paths, and in one embodiment can consist of this.

For these phases or partial paths, different constraints are specified in a step S20, in this example the aforementioned constraints $N_S$ for the approach or the approach path, $N_{SE}$ for the processing or inspecting or measuring or the processing, inspection and/or measuring path and $N_E$ for the departure or the departure path. The specification can be made in particular on the basis of a user input or specification or can be made automatically, for example on the basis of an assignment of specified constraints to different application phase types or partial path types or the like.

In a step S30, different priorities (priority levels) are assigned to the different constraints. This assignment can be made in particular on the basis of a user input or specification or can be made automatically, for example on the basis of a specified hierarchy of constraints or the like. For example, adherence to a specified orientation along a processing, inspection and/or measuring path can take precedence over minimizing travel time and an energy requirement or the like. By assigning on the basis of a user input or specification, expert knowledge can be used particularly advantageously, since application engineers are often best able to judge which constraints are most or least important. In the above example, the highest priority (level) is assigned to the constraint $N_{SE}$ for the processing, inspection and/or measuring path, the lowest priority (level) is assigned to the constraints $N_E$ for the departure path, and a medium priority (level) is assigned to the constraints $N_S$ for the approach path, which medium priority (level) is lower than the highest priority (level) assigned to the constraint $N_{SE}$ for the processing, inspection and/or measuring path and higher than the lowest priority (level) assigned to the constraint $N_E$ for the departure path.

In a step S40, the partial path is now first planned whose constraint to be satisfied during its planning is (has been) assigned the highest priority (level), in the above example the processing, inspection and/or measuring path. This planning is carried out in a manner known per se on the basis of the specified initial pose S and specified final pose E taking into account the specified constraint $N_{SE}$ using an optimization method and defines positions $q_i=[q_1, q_2, \ldots q_7]_i$ of the robot (arm) 1 along the processing, inspection and/or measuring path, in particular a (its) position $q_S$ in or for the initial pose S and a (its) position $q_E$ in or for the final pose E.

In a step S50, the partial path is then planned whose constraint to be satisfied during its planning is (has been) assigned the next-lowest priority (level), in the above example the approach path. This planning is carried out in a manner known per se on the basis of the specified start pose or position and the robot (arm) position $q_S$ determined in step S40 taking into account the specified constraint $N_S$ using the same or a different optimization method and accordingly defines positions $q_i$ of the robot (arm) 1 along the approach path.

The approach path is planned in such a way that it transfers the robot (arm) 1 at its end into the position $q_S$ determined in step S40.

It can be seen from this example that the search space for planning the approach path is significantly reduced by the position $q_S$ already determined in step S40. In this way, in one embodiment, the (partial) path can be planned with low(er) computing time and/or computing power and/or the risk of the optimization method only finding local minima, in particular ending in such a dead end, can be reduced. It can also be seen that the primary aim is to satisfy the highest-priority constraint $N_{SE}$, and the comparatively lower-priority constraint $N_S$ is (still) satisfied as far as this is (still) possible given the higher-priority constraint $N_{SE}$.

In a step S60, the partial path is then planned whose constraint to be satisfied during its planning is (has been) assigned the next-lowest priority (level), in the above example the departure path. This planning is carried out in a manner known per se on the basis of the specified target pose or position and the robot (arm) position $q_E$ determined in step S40 taking into account the specified constraint $N_E$ using the same or a different optimization method and accordingly defines positions $q_i$ of the robot (arm) 1 along the departure path.

The departure path is planned in such a way that it begins at or in the position $q_E$ determined in step S40.

This also illustrates by way of example the reduction of the search space for planning the departure path by the position $q_E$ already determined in step S40, so that in one embodiment the (partial) path can be planned with low(er) computing time and/or computing power and/or the risk of the optimization method only finding local minima, in particular ending in such a dead end, can be reduced. It can also be seen that the primary aim is to satisfy the highest-priority constraint $N_{SE}$, then to (still) satisfy the comparatively lower-priority constraint $N_S$ to the extent that this is (still) possible given the higher-priority constraint $N_{SE}$, and finally to (still) satisfy the even lower-priority constraint $N_E$ to the extent that this is (still) possible given the higher-priority constraints $N_{SE}$, $N_S$.

In a step S70, the controller 2 connects the planned partial paths and controls the robot (arm) 1 to follow the planned path to carry out the application. In particular, the connection can also be made by connecting a subsequently planned partial path to the already planned partial path during its planning, in particular by connecting to it or continuing it. Thus, in general, planning the path of the robot for carrying out the application, wherein the planned partial paths are joined together in a transitional region and these joined partial paths form the path of the robot or part of this path, can (already) be achieved by planning the individual partial paths, in the exemplary embodiment the steps S40-S60.

Although exemplary embodiments have been explained in the preceding description, it is pointed out that a large number of modifications is possible.

Thus, again purely by way of example and for illustrative purposes only, the planning of the approach path or departure path could be omitted and/or the constraint $N_S$ or $N_E$ for the approach path or departure path could be prioritized higher than the constraint for the processing, inspection and/or measuring path $N_{SE}$.

For example, in a modification in step S40, the approach path is planned first instead of the processing, inspection and/or measuring path. This planning is then carried out in a manner known per se on the basis of the specified start pose or position and the specified initial pose S taking into account the specified constraint $N_S$ using an optimization method and defines positions $q_i$ of the robot (arm) 1 along the processing, inspection and/or measuring path, in particular a (its) position $q_S$ in or for the initial pose S. In one embodiment, a part of the constraint that only applies to the initial pose S is already taken into account; in the example the orientation of the TCP specified for this purpose can be implemented. In other words, the redundancy that is (still) permitted or available from the perspective of the subsequent processing, inspection and/or measuring path is utilized here. Of course, it is equally possible by analogy to already take into account the part of the constraint for the preceding partial path that only refers to the transitional region between these two partial paths when carrying out the prioritized planning of a subsequent partial path.

In step S50, the processing, inspection and/or measuring path is then planned. This planning is carried out in a manner known per se on the basis of the specified final pose E and the robot (arm) position $q_S$ determined in step S40 taking into account the specified constraint $N_{SE}$ using the same or a different optimization method and defines positions q of the robot (arm) 1 along the processing, inspection and/or measuring path, in particular a (its) position $q_E$ in or for the final pose E.

This also illustrates by way of example the reduction of the search space for planning the processing, inspection and/or measuring path by the position $q_S$ already determined in step S40, so that in one embodiment the (partial) path can be planned with low(er) computing time and/or computing power and/or the risk of the optimization method only finding local minima, in particular ending in such a dead end, can be reduced. It can be seen again that the primary aim is to satisfy the higher-priority constraint $N_S$, and then to (still) satisfy the comparatively lower-priority constraint $N_{SE}$ as far as this is (still) possible given the higher-priority constraint $N_S$.

Figure 1:
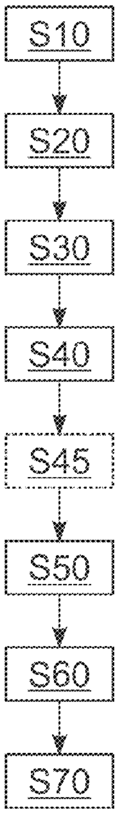
FIG. 1 shows a method according to one exemplary embodiment of the present invention.

In the above examples, a robot position was determined by planning a partial path with a higher-priority constraint and this robot position was used when planning a partial path with a lower-priority constraint. It can be particularly advantageous to use the robot position determined in the higher-priority planning as the starting or final position in the lower-priority planning. In the above example, this means using the approach path to approach the robot (arm) position $q_S$ determined in the higher-priority planning of the processing, inspection and/or measuring path or, conversely, the processing, inspection and/or measuring path to continue from the robot (arm) position $q_S$ determined in the higher-priority planning of the approach path, or the departure path to continue from the robot (arm) position $q_E$ determined in the higher-priority planning of the processing, inspection and/or measuring path. However, it is also possible to calculate the starting or final position used in the lower-priority planning on the basis of the robot position determined in the higher-priority planning, in particular on the basis of a specified mapping or transformation. Thus, again purely by way of example and for illustrative purposes only, the robot (arm) 1 of FIG. 1 could be arranged on a mobile platform which is moved a specified route between the end of the planned approach path and the beginning of the planned processing, inspection and/or measuring path. Then, a robot (arm) position $q_S$ can first be determined for the priority-planned processing, inspection and/or measuring path, and the robot (arm) position $q_S$' to be approached on the approach path can be planned on this basis, while compensating for the travel distance. In this case, a transitional region between the approach path and the processing, inspection and/or measuring path comprises the travel distance.

It is also pointed out that the exemplary embodiments are merely examples that are not intended to restrict the scope of protection, the applications, and the structure in any way. Rather, the preceding description provides a person skilled in the art with guidelines for implementing at least one exemplary embodiment, with various changes, in particular with regard to the function and arrangement of the described components, being able to be made without departing from the scope of protection as it arises from the claims and from these equivalent combinations of features.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

1 Robot (arm)
2 Controller
TCP Tool center point (robot-fixed reference)
$q_1, \ldots q_7$ Joint coordinates

What is claimed is:

1. A method for planning a path of a robot for carrying out a robot application, the method comprising:
- dividing the application into at least two successive phases;
- specifying a first constraint for a first phase of the at least two successive phases and a second constraint different from the first constraint for a second phase of the at least two successive phases;
- assigning a priority to one of the first or second constraints and a comparatively higher or lower priority to the other of the first or second constraints;
- planning a partial path for carrying out the phase of the first or second phases for which the specified constraint has the higher assigned priority, while taking this constraint into account;
- subsequently planning a partial path for carrying out the phase of the first or second phases for which the specified constraint has the lower assigned priority, while taking this constraint into account and based on the partial path previously planned for carrying out the phase of for which the specified constraint has the higher assigned priority;
- planning the path of the robot for carrying out the robot application, wherein the planned partial paths are joined together in a transitional region and these joined partial paths form the path of the robot or part of this path; and
- controlling the robot to follow the planned path.

2. The method according to claim 1, wherein:
- the application is divided into at least three successive phases;
- for each of these three phases a constraint is specified;
- each of these three constraints is assigned a different priority;
- a partial path is planned for carrying out the phase of the three phases for which the constraint assigned the highest of the three priorities has been specified, while taking this constraint into account;
- subsequently, a partial path is planned for carrying out the phase of the three phases for which the constraint assigned the next lowest of the three priorities has been specified, while taking this constraint into account and on the basis of the partial path previously planned for carrying out the phase of the three phases for which the constraint assigned the highest of the three priorities has been specified;
- subsequently, a partial path is planned for carrying out the phase of the three phases for which the constraint assigned the lowest of the three priorities has been specified, while taking this constraint into account and on the basis of one of the two partial paths previously planned; and
- the planned partial paths are each joined together in pairs in a transitional region and to thereby form the path of the robot or part of this path.

3. The method according to claim 1, wherein at least one of:
- at least one of the phases of the application has a processing, inspection and/or measuring phase for robot-assisted processing, inspection and/or measuring of a workpiece, and the partial path planned for carrying out this phase is a processing, inspection and/or measuring path of the robot;
- at least one of the phases of the application has an approach phase for approaching a processing, inspection and/or measuring path or a conveying or storage location, and the partial path planned for carrying out this phase is an approach path of the robot; or
- at least one of the phases of the application has a departure phase for moving away from a processing, inspection and/or measuring path or a conveying or storage location, and the partial path planned for carrying out this phase has a departure path of the robot.

4. The method according to claim 1, wherein planning at least one of the partial paths, comprises taking into account a part of the constraint that is specified for carrying out a preceding or subsequent phase of the application for which a lower priority has been assigned.

5. The method according to claim 1, wherein at least one of the constraints comprises at least one of:
- collision avoidance;
- at least one pose of a robot-fixed reference of the robot; or
- an optimization of at least one of a travel time, a load, or an energy requirement of the robot for carrying out the corresponding phase of the application.

6. The method according to claim 1, wherein the robot is redundant with regard to at least one of the phases of the application.

7. The method according to claim 1, wherein at least one of the partial paths is planned using an optimization method.

8. A system for planning a path of a robot for carrying out a robot application, in particular for controlling the robot, the system comprising:

means for dividing the application into at least two successive phases;

means for specifying a first constraint for a first phase of the at least two successive phases and a second constraint different from the first constraint for the a second phase of the at least two successive phases;

means for assigning a priority to one of the first or second constraints and a comparatively higher or lower priority to the other of the first or second constraints;

means for planning a partial path for carrying out the phase of the first or second phases for which the specified constraint has the higher assigned priority, while taking this constraint into account;

means for subsequently planning a partial path for carrying out the phase of the first or second phases for which the specified constraint has the lower assigned priority, while taking this constraint into account and based on the partial path previously planned for carrying out the phase for which the specified constraint has the higher assigned priority; and means for planning the path of the robot for carrying out the robot application, wherein the planned partial paths are joined together in a transitional region and these joined partial paths form the path of the robot or part of this path.

9. A computer program product comprising program code stored on a non-transitory, computer-readable storage medium, the program code, when executed by one or more computers or a system, causing the computer(s) or system to carry out the method according to claim 1.

* * * * *